Aug. 21, 1956  J. A. FLIPPEN  2,759,685
CLOTHESLINE APPARATUS
Filed Nov. 30, 1953
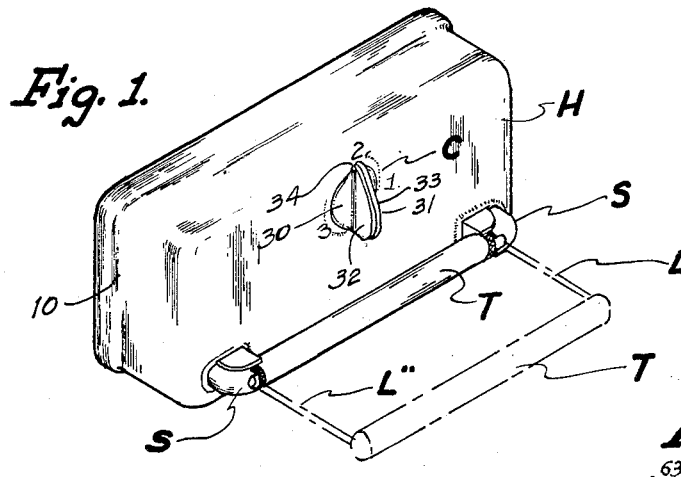
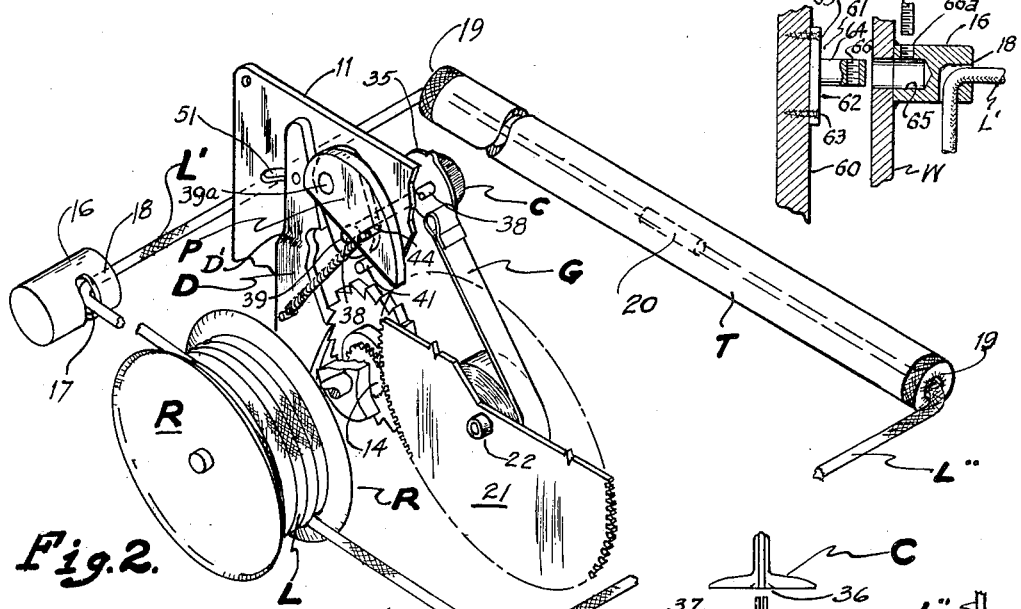
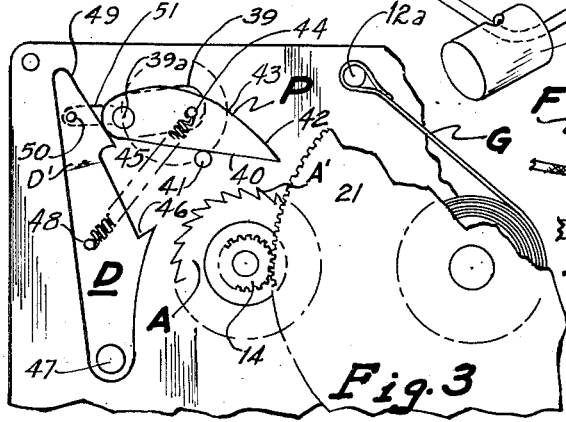
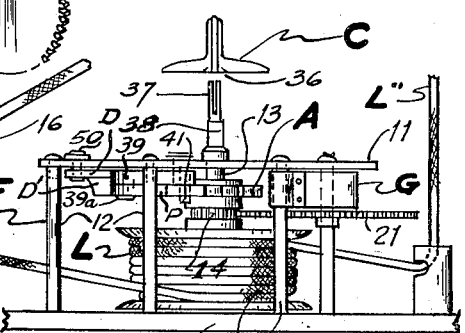
INVENTOR.
JAMES A. FLIPPEN
BY
Fulwider, Mattingly
& Babcock

United States Patent Office 2,759,685
Patented Aug. 21, 1956

2,759,685

CLOTHESLINE APPARATUS

James A. Flippen, Santa Ana, Calif.

Application November 30, 1953, Serial No. 394,981

2 Claims. (Cl. 242—102)

The present invention relates to the field of clothesline apparatus, and more particularly to a weather protected reel on which a clothesline is disposed when not in use, but from which it may be readily unwound as needed to assume a taut, clothes-supporting position.

Although numerous reels and clothesline-supporting devices have been devised and marketed in the past, the majority of these devices make no provision for protecting the line from the weather when not in use, are of a complicated, expensive mechanical structure, bulky and unattractive in appearance, and as a result retail at such a high price as to discourage their widespread use and acceptance by the general public.

The primary purpose in devising my present invention is to provide a clothesline apparatus that eliminates the disadvantages of the previously avaliable apparatus of this nature.

A major object of my invention is to provide an apparatus which provides protection from the deteriorating effects of the weather for a clothesline when not in use, yet permits easy positioning of the line in a clothes-supporting position with the desired amount of tension on the line.

Another object of the invention is to supply a clothesline apparatus embodying a selective control, which when disposed in one position permits the line to be withdrawn from, or caused to enter the confines of a protective housing, when moved to another position will prevent the line from unreeling, and when ultimately moved between two predetermined positions causes the clothesline to assume a taut condition with the desired amount of tension thereon due to the retraction of the line into the housing by intermittent steps.

A further object of my invention is to provide a clothesline apparatus that may be readily mounted on a convenient wall surface, is attractive in appearance, is relatively simple in structure, may be fabricated from standard, commercially available materials and produced at a sufficiently low price to enable sale thereof in the medium priced merchandising field to encourage its widespread use.

A still further object of the invention is to supply a clothesline apparatus which is extremely simple to use, requires little or no maintenance attention, and very materially extends the life of a conventional clothesline by fully protecting it from the action of the weather when the line is not in use.

Yet another object of my invention is to provide a clothesline apparatus in which a plurality of clotheslines may be concurrently disposed in a clothes-supporting position, with each line being subjected to substantially the same amount of tension when disposed in a clothes-supporting position.

These and other objects and advantages of my invention will become apparent from the following description of the preferred form thereof, and the drawing illustrating that form in which:

Figure 1 is a front perspective view of my clothesline apparatus showing the line fully retracted within the interior thereof, and showing the position occupied by a portion of the line and the tubular member connected thereto when in an extended clothes-supporting position, in phantom line;

Figure 2 is a fragmentary perspective view of the mechanism used in dispensing and retracting clothesline from the housing and the selective control employed in conjunction with the mechanism;

Figure 3 is a fragmentary side elevational view of the actuating and braking mechanism used in conjunction with the line-supporting reel;

Figure 4 is a plan view of the wall plate and actuating mechanism mounted with the housing shown in Figure 1 removed from the wall plate; and Figure 5 is a horizontal cross-sectional view of a wall mounting adapted to removably engage a clothesline guide for the support of the apparatus.

Referring now to the drawing for the general arrangement of my invention, it will be seen that it includes a substantially rectangular wall plate W that removably supports a housing H. Housing H has a combined control and actuating member C mounted on the exterior thereof, as well as two laterally spaced elements S adapted to removably engage a tubular member T.

The tubular member T is mounted on the free end portions of two clothesline portions L′ and L″ that extend outwardly from a coil of clothesline L disposed on a reel R. In Figure 4 it may be seen that reel R is rotatably supported between wall plate W and a frame F that extends forwardly therefrom. Frame F is of such size as to fit within the confines of housing H. A spring G is provided which serves to rotate reel R in a direction to retract line portions L′ and L″ into the confines of the housing when control C is moved to a predetermined position. The tension on line portions L′ and L″ may be increased by rotating the actuating member and control C between two predetermined positions, as will be described in detail hereinafter. This tensioning is made possible by means of a pawl P which intermittently rotates a ratchet wheel A that concurrently rotates the reel R. The reel R may be held in a stationary position to prevent further unreeling of the line therefrom by so disposing the member C as to permit a detent D to engage the ratchet wheel A, as may best be seen in Figures 3 and 4.

The wall plate W is of a substantially rectangular shape and of such size as to slidably engage a continuously extending flanged portion 10 formed on the rearwardly disposed edge of housing H. Wall plate W is preferably supplied with means (not shown) to permit it to be removably affixed to a suitable vertical wall surface. Frame F embodies a forwardly disposed plate 11 that is parallel to wall plate W, which plate is rigidly connected to the wall plate by a series of rods 12, as best seen in Figure 4. One of these rods 12 serves as an anchor to which the upper end of spring G is affixed. A shaft 13 extends between, and is journaled in wall plate W and plate 11, which shaft mounts reel R and ratchet wheel A. A pinion 14 is also mounted on shaft 13 which is interposed between ratchet wheel A and the forwardly disposed face of reel R.

Two clothesline guides 16 of identical construction are positioned on the wall plate W at each side of the reel R. Guides 16 are of cylindrical configuration and an inwardly extending slot 17 formed therein intersects a bore 18 extending inwardly into the guide from the forwardly disposed face thereof. Clothesline sections L′ and L″ each pass through slots 17 and bores 18 in guides 16 as tubular member T is moved upwardly relative to the reel R. The rearwardly disposed faces of guides 16 may be rigidly affixed to the wall plate W by conventional means (not shown). To minimize frictional wear on the clothesline portions L' and L" in passing through guides 16 the line-contacting faces of slots 17 and bores 18 may be coated with or fabricated from a material that offers little frictional resistance to the moving clothesline.

After leaving guides 16 the line portions L' and L" are normally disposed to the wall plate W when under tension, and as may be seen in Figure 2, they are also parallel to one another when under tension. The tubular member T is preferably formed from a light-weight material such as aluminum or magnesium, or an alloy thereof, and is provided with closures 19 on the ends thereof. A centrally disposed longitudinally extending bore is formed in closures 19 through which the free ends of the line portions L' and L" extend. The two free ends of the clothesline portions are knotted or otherwise joined at a junction 20 (shown in phantom line in Figure 2) which junction is disposed within the confines of tubular member T.

The pinion 14 (Figures 2 and 4) is engaged by a gear 21 rigidly affixed to a horizontally disposed shaft 22. Spring G is of the helically wound type and encircles shaft 22. The inner end of spring G is rigidly affixed to shaft 22, which is journaled and supported from plate 11. Spring G is at all times in tension and tends to constantly rotate gear 21, pinion 14, shaft 13 and reel R. When actuated by spring G the direction of rotation of gear 21 causes reel R to draw line portions L' and L" inwardly to be coiled on the reel. Maximum inward movement of the clothesline portions is attained when the two ends of tubular member T are adjacently disposed to elements S as shown in Figure 1. Elements S may take a variety of forms, depending upon the particular decorative motif employed for housing H.

In practice it has been found that elements S may be formed substantially in the shape of quadrants of a circle and are laterally spaced from one another on the exterior surface of housing H. Elements S must be of a thickness to permit formation of a groove in one of the straight faces thereof, and the grooves are sufficiently deep and wide to allow for slidable engagement with the extremities of tubular member T.

The operation of my invention as previously mentioned, is controlled by a combination actuating member and control C, which is preferably an integrally formed disc 30 having a narrow raised handle 31 extending thereacross. Handle 31 is defined by two spaced side walls 32 and an angularly disposed upper edge 33. The edge 33 serves as an indicator 34, the purpose of which will hereinafter become apparent. Actuating member and control C has a flat interior face 35 disposed adjacent the front face of housing H. An elongate recess 36 extends inwardly into actuating member and control C from face 35 thereof, and has longitudinal ribs or keys which engage groove 37 formed in a shaft 38.

Shaft 38 projects from and is journaled by conventional means in plate 11. A flat elongate arm 39 is rigidly affixed on one end to the inner extremity of shaft 38, and a pin 39a projects from arm 39 which pivotally engages the outer end portion of pawl P. The straight lower edge 40 of pawl P is slidably supported on a pin 41 that extends inwardly from plate 11. Pawl P has a forwardly pointed end 42 formed at the intersection of the lower edge 40 and an upper angularly disposed edge 43. A pin 44 projects from substantially the center of the pawl, which pin is engaged by the upper end of a downwardly and outwardly extending helical spring 45. Spring 45 is constantly in tension whereby the lower edge 40 of pawl P is maintained in movable contact with pin 41, as best seen in Figure 3.

The detent D has a pointed outwardly extending portion 46 adapted to engage the ratchet wheel A. Detent D is pivotally mounted at its lower end by a pin or screw 47 that projects rearwardly from plate 11. A pin 48 is also provided (Figure 3) that serves to affix the lower end of spring 45 to the detent. The detent D has an upwardly and outwardly extending portion D' formed therein as may best be seen in Figure 2 that offsets the the upper portion of the detent outwardly toward the plate 11. The upper portion of detent D is of roughly triangular configuration having an angularly disposed interior edge 49 which slidably contacts the extreme outer edge of arm 39. Spring 45 is at all times in tension, and tends to pivot the detent into a position where the pointed portion 46 thereof will engage one of the ratchet wheel teeth A'. When portion 46 so engages one of the teeth A', reel R is locked in a position whereby tubular member T and lines L' and L" cannot move outwardly relative to housing H. A pin 50 extends forwardly from the upper portion of detent D, and is movable in a slot 51 formed in plate 11. The length of slot 51 determines the limits of possible pivotal movement of detent D. To operate my invention the actuating member and control C simply is manually pivoted to one of the three positions provided, which are generally designated by numerals 1, 2 and 3, or other identifying means imprinted on the housing exterior. Numerals 1, 2 and 3 are placed in substantially 90° spaced relationship on the housing H, with numerals 1 and 3 being oppositely located on the horizontals axis extending through the center of rotation of control C, and numeral 2 positioned on the vertical axis thereof.

In order to use my invention for its intended purpose the plate W is affixed to a wall or other vertically disposed member by conventional fastening means not shown. Hooks or brackets (not shown) are secured to an opposing wall or other vertical member oppositely spaced a suitable distance from the mounted unit and at a corresponding elevation relative thereto, which hooks can be engaged by tubular member T.

When it is desired to hang clothes on the clothesline of my device, the actuating member and control C is rotated until the indicator 34 is in alignment with numeral 1, which causes pawl P and detent D to assume the configuration shown in Figure 3. With the indicator 34 in this position, the clothesline may be unreeled by grasping handle T and pulling it away from housing H. It will be noted that neither the pawl nor the detent engage the ratchet wheel A, and consequently the reel R can be rotated to allow clothesline portions L' and L" to unreel therefrom. Rotation of reel R at this point causes concurrent rotation of gear 21 in a direction to increase the tension on spring G. Thus, the tension on spring G is at its maximum value when the line portions L' and L" are fully extended. Due to the tension of spring G, the gear wheel 21 tends to rotate in a direction to cause the clothesline portions to be retracted into the housing H and rewound on reel R upon release of tubular member T from engagement with the previously mentioned hooks or fastening means. Thus it will be seen that the clothesline portions L' and L" are automatically returned to the confines of the housing and the tubular member T is engaged by elements S by simply rotating the actuating member and control C until indicator 34 thereof is in alignment with numeral 1.

To lock the reel R and prevent further withdrawal of the line therefrom member C is rotated until the indicator 34 is in alignment with numeral 2. In this position, arm 39 as shown in Figure 2 has rotated sufficiently for the pointed portion 46 of detent D to engage the teeth A' of ratchet wheel A, but the point 42 of the pawl P does not yet contact the ratchet wheel.

In order to increase the tension on clothesline portions L' and L", the indicator 34 on actuating member and control C is alternately moved back and forth between numerals 2 and 3. As member C moves toward numeral 3 arm 39 is rotated in a clockwise direction as viewed in Figures 2 and 3. This rotation of arm 39 in turn moves the pointed end of pawl P into engagement with one of the teeth A' of ratchet wheel A, and by means of this intermittent rotation of the ratchet wheel and reel R the lines L' and L" are drawn within the confines of the housing a segment at a time. The ratchet wheel A, cannot rotate in a counterclockwise direction as shown in Figure 3 when the actuating member and control C is returned to alignment with numeral 2, for the detent portion 46 is in engagement with one of the teeth A' at this time. Detent D is not disengaged from ratchet wheel A to allow free rotation of reel R until the member C has been moved from the No. 2 position to that of the No. 1 position.

The plate W may be rigidly and removably supported from a wall or vertical member 60 by use of two of the holders 61 shown in Figure 5. Each of the holders 61 includes a rigid base 62 affixed to the member 60 at the desired location by means of two spaced screws 63. A short horizontally disposed rod 64 extends outwardly from each base 62 which rod adapted to be slidably inserted in a bore 65 formed in the wall plate W and extending into one of the guides 16. Each rod has a transverse tapped bore 66 formed in the outer portion thereof that is in alignment with a similar tapped bore 66a formed in one of the guides 16 when the rearward surface of plate W and the forward surface of base 62 abut against one another. A set screw 67 engages bore 66 and 66a when the plate W and base 62 are in abutting relationship. This manner of supporting my clothesline apparatus on a vertical member provides the advantage that all outward pull on the clothesline L is through the guides 16, rod 64 and base 62, with the result that there is no tendency to deform the housing H and wall plate W.

Although the use and operation of my invention herein shown and described is fully capable of achieving the objects and providing the advantages hereinbefore mentioned, it is to be understood that it is merely illustrative of the presently preferred embodiment of the device and that I do not mean to be limited to the details of construction herein shown other than defined in the appended claims.

I claim:

1. A clothesline apparatus, which includes: a wall plate; a clothesline reel rotatably mounted on said wall plate; a clothesline wound on said reel, portions of which line are adapted to be unreeled from opposite ends of said reel; two laterally spaced line guides supported from said plate through which said lines pass as they unreel; a rigid tubular member of substantially the same length as the spacing between said guides, the free ends of said line being joined within the confines of said member, and said guides and member cooperating to maintain the portions of said line not on said reel in spaced parallel relationship when said line portions are tautly extended; a housing mounted on said plate that encloses said reel; means mounted on the exterior of said housing for removably supporting said member when substantially all of said line is disposed on said reel; spring means in said housing that at all times tend to rotate said reel and maintain said member in position on said supporting means; a ratchet wheel that is co-revolvable with said reel; detent means that is normally pivotally biased into engagement with said ratchet wheel to prevent line-unreeling rotation of said reel; and pawl means that is manually operable from the exterior of said housing which when moved to a first position moves said detent means out of engagement with said ratchet wheel to permit line-unreeling rotation of said reel, when moved to a second position permits said detent means to engage said ratchet wheel to prevent line-unreeling rotation of said reel, and when moved to a third position rotates said ratchet wheel to cause rewinding rotation of said reel to tension said taut and extended line portions.

2. A clothesline apparatus, which includes: a substantially rectangular wall plate; a reel; a shaft rotatably supported from said plate to which said reel is affixed; a clothesline wound on said reel, portions of which line are adapted to be unreeled from opposite ends of said reel; two laterally spaced line guides supported from said plate through which said lines pass as they unreel; a rigid tubular member of substantially the same length as the spacing between said guides, the free ends of said line being joined within the confines of said member, and said guides and member cooperating to maintain the portions of said line not on said reel in spaced parallel relationship when said line portions are tautly extended; a housing mounted on said plate that encloses said reel; means mounted on the exterior of said housing for removably supporting said member when substantially all of said line is disposed on said reel; a pinion affixed to said shaft; a gear wheel engaging said pinion; spring means which is at all times under deformation and tends to rotate said gear wheel, pinion and reel, and position said member on said supporting means; a ratchet wheel that is co-revolvable with said reel; detent means that is normally pivotally biased into engagement with said ratchet wheel to prevent line-unreeling rotation of said reel; and pawl means that is manually operable from the exterior of said housing which when moved to a first position moves said detent means out of engagement with said ratchet wheel to permit line-unreeling rotation of said reel, when moved to a second position permits said detent means to engage said ratchet wheel to prevent line-unreeling rotation of said reel, and when moved to a third position rotates said ratchet wheel to cause rewinding rotation of said reel to tension said taut and extended line portions.

References Cited in the file of this patent

UNITED STATES PATENTS

| | | |
|---|---|---|
| 700,517 | Lindsay et al. | May 20, 1902 |
| 2,391,840 | Meletti | Dec. 25, 1945 |
| 2,393,511 | Beede | Jan. 22, 1946 |